US010895897B1

(12) United States Patent
Mills

(10) Patent No.: US 10,895,897 B1
(45) Date of Patent: *Jan. 19, 2021

(54) HEAT DISSIPATING ASSEMBLY FOR HEAD-MOUNTED DISPLAYS

(71) Applicant: Facebook Technologies, LLC, Menlo Park, CA (US)

(72) Inventor: Jeffrey P. Mills, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/749,912

(22) Filed: Jan. 22, 2020

Related U.S. Application Data

(63) Continuation of application No. 15/677,990, filed on Aug. 15, 2017, now Pat. No. 10,579,114.

(51) Int. Cl.
| G06F 1/20 | (2006.01) |
| G02B 27/01 | (2006.01) |
| G06F 1/16 | (2006.01) |
| G06F 3/01 | (2006.01) |

(52) U.S. Cl.
CPC .......... *G06F 1/206* (2013.01); *G02B 27/0176* (2013.01); *G06F 1/163* (2013.01); *G06F 3/011* (2013.01)

(58) Field of Classification Search
CPC .......... G06F 1/206; G06F 3/011; G06F 1/163; G02B 27/0176
See application file for complete search history.

(56) References Cited

U.S. PATENT DOCUMENTS

| 6,538,624 | B1 | 3/2003 | Karasawa et al. |
| 10,579,114 | B1 * | 3/2020 | Mills ....................... G06F 1/203 |
| 2002/0167794 | A1 | 11/2002 | Ronzani et al. |
| 2005/0121031 | A1 | 6/2005 | Ebersole |
| 2016/0255748 | A1 | 9/2016 | Kim et al. |
| 2017/0168303 | A1 | 6/2017 | Petrov |
| 2017/0184863 | A1 | 6/2017 | Balachandreswaran et al. |

\* cited by examiner

*Primary Examiner* — Andrew Sasinowski
(74) *Attorney, Agent, or Firm* — Fenwick & West LLP

(57) ABSTRACT

A head-mounted-display (HMD) includes a face plate, and a main body. The main body attaches the face plate to cover a front portion of the main body. The main body includes a front plate, a back plate, and a circuit board. The front plate includes at least one first air channel formed at a rear side of the front plate facing away from the face plate for conveying air from a bottom portion of the main body to an upper portion of the main body. Each of the front plates may be formed with windows for receiving an intake air or discharging an outflow air. The back plate is attached to the front plate and located further away from the face plate. The circuit board is located between the front plate and the back plate.

13 Claims, 5 Drawing Sheets

HEAT DISSIPATING ASSEMBLY FOR HEAD-MOUNTED DISPLAYS

CROSS REFERENCE TO RELATED APPLICATIONS

This application is a continuation of co-pending U.S. application Ser. No. 15/677,990, filed Aug. 15, 2017, which is incorporated by reference in its entirety.

BACKGROUND

Field of the Disclosure

The present disclosure generally relates to head-mounted displays, and specifically to a heat dissipating assembly for head-mounted displays.

Description of the Related Arts

Head-mounted displays (HMDs) have wide applications in various fields, including engineering design, medical surgery practice, military simulated practice, and video gaming. For example, a user wears a HMD while playing video games so that the user can have a more interactive experience in a virtual environment. As opposed to other types of display devices, a HMD is worn directly over a user's head. The HMD may directly interface with a user's face while dissipating huge amount of heat generated inside the HMD directly on the user's face. Typical active cooling devices used in the HMD to cool down the circuitry inside the HMD are often bulky and expensive, and thus increase the size, weight, and cost of the HMDs. Accordingly, such HMDs are uncomfortable to wear directly over a user's head.

SUMMARY

Embodiments relate to a head-mounted-display (HMD) with a face plate, and a main body. The main body attaches the face plate to cover a front portion of the main body. The main body includes a front plate, a back plate, and a circuit board. The front plate includes at least one first air channel formed at a rear side of the front plate facing away from the face plate for conveying air from a bottom portion of the main body to an upper portion of the main body. Each of the front plates may be formed with windows for receiving an intake air or discharging an outflow air. The back plate is attached to the front plate and located further away from the face plate. The circuit board is located between the front plate and the back plate. In some embodiments, the first air channel is defined by a set of ribs extending vertically.

In some configurations, the front plate of the HMD includes at least one heat pipe at a front side of the front plate. The heat pipe may traverse at least one first air channel to improve thermal dissipation. The back plate includes second air channels for conveying air from the bottom portion of the main body to the upper portion of the main body. The back plate includes at least a subset of the second air channels conjoined with at least one first air channel. The back plate includes a first heat plate and a second heat plate thermally coupled to the first heat plate. The first heat plate may be horse-shoe shaped.

In some configurations, the HMD includes an air gap formed across a periphery of the face plate and an inner wall of the main body to intake air between the front plate and the back plate and to discharge air passing through the front plate and the back plate. The front plate may include heat conductor columns extending vertically to enhance heat transfer to air passing through the at least one first channel.

BRIEF DESCRIPTION OF THE DRAWINGS

The teachings of the embodiments can be readily understood by considering the following detailed description in conjunction with the accompanying drawings.

The figures depict embodiments of the present disclosure for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments related to thermal design of a head-mounted-display (HMD) for dissipating heat generated within the HMD. The HMD includes a face plate, and a main body. The main body attaches the face plate to cover a front portion of the main body. The main body includes a front plate, a back plate, and a circuit board. The front plate includes at least one first air channel formed at a rear side of the front plate facing away from the face plate for conveying air from a bottom portion of the main body to an upper portion of the main body. Each of the front plates may be formed with windows for receiving an intake air or discharging an outflow air. The back plate is attached to the front plate and located further away from the face plate. The circuit board is located between the front plate and the back plate.

Figure 1:
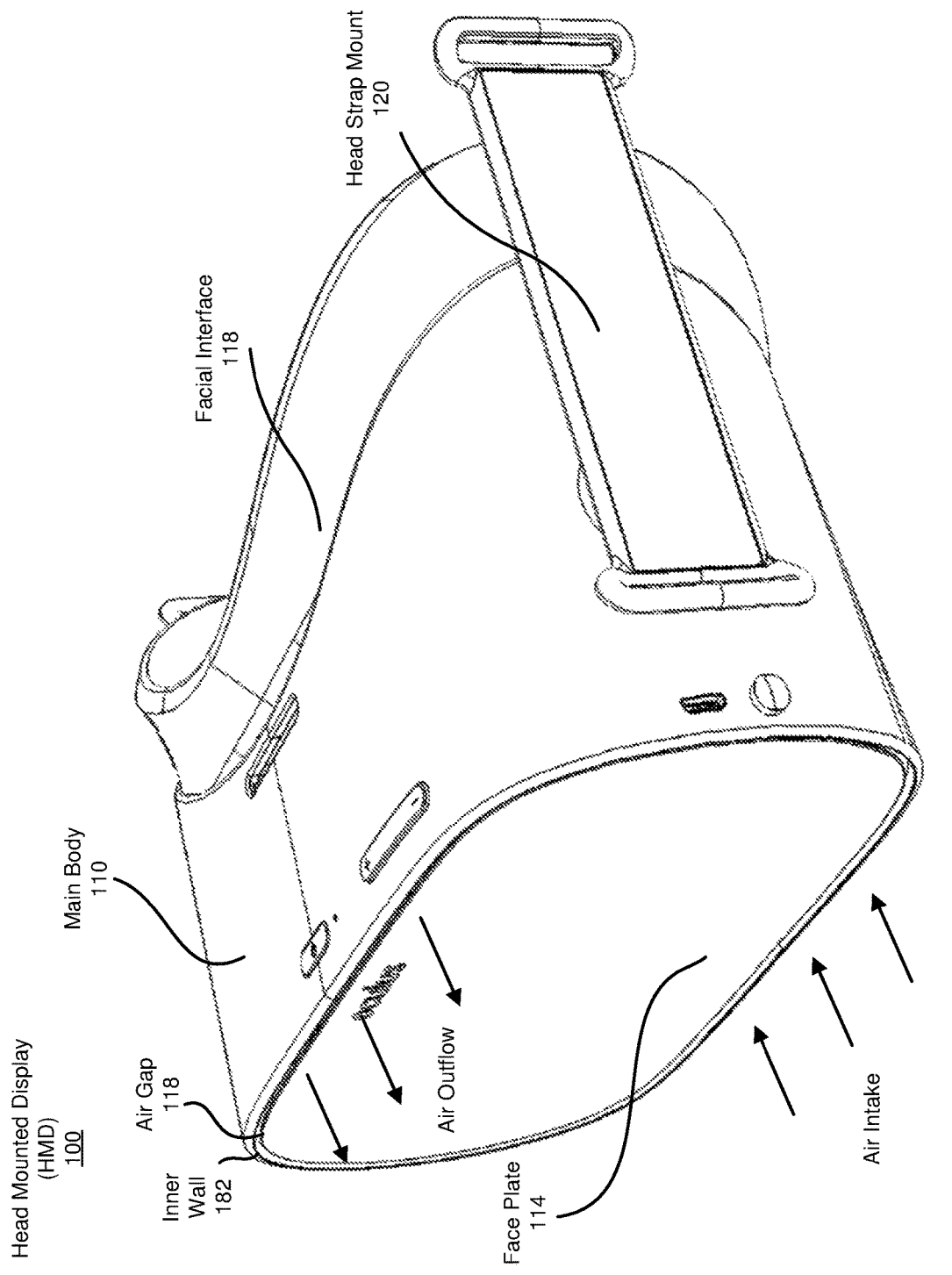
FIG. 1 is a perspective view of a head-mounted display (HMD) with a main body and a face plate, in accordance with one embodiment.

FIG. 1 is a perspective view of a head-mounted display (HMD) 100 with a main body 110 and a face plate 114, in accordance with one embodiment. The HMD may include a face plate 114, a main body 110, a facial interface 118 and head strap mounts 120 (only the left head strap mount 120 is illustrated in FIG. 1).

The main body 110 encloses components including printed circuit board (PCB) and display devices that may generate heat. To dissipate the heat generated by these components, the main body 110 includes components to facilitate heat dissipation, as described below in detail with reference to FIGS. 2 through 5.

The face plate 114 covers a front portion of the main body 110. The main body 110 and the face plate 114 are attached to form an air gap 122 to receive an air intake and discharge an outflow by convection, as described below in detail with reference to FIGS. 2 through 5. The air gap 122 is formed across the periphery of the face plate 114 and an inner wall 124 of the main body 110. For this purpose, the outer dimension of the face plate 114 may be smaller than the dimension of the inner wall 124 of the main body 110.

The facial interface 118 is a portion of the HMD 100 that interfaces with the user's face. The head strap mount 120 mounts a head strap that secures the HMD 100 to the user's head.

Figure 2:
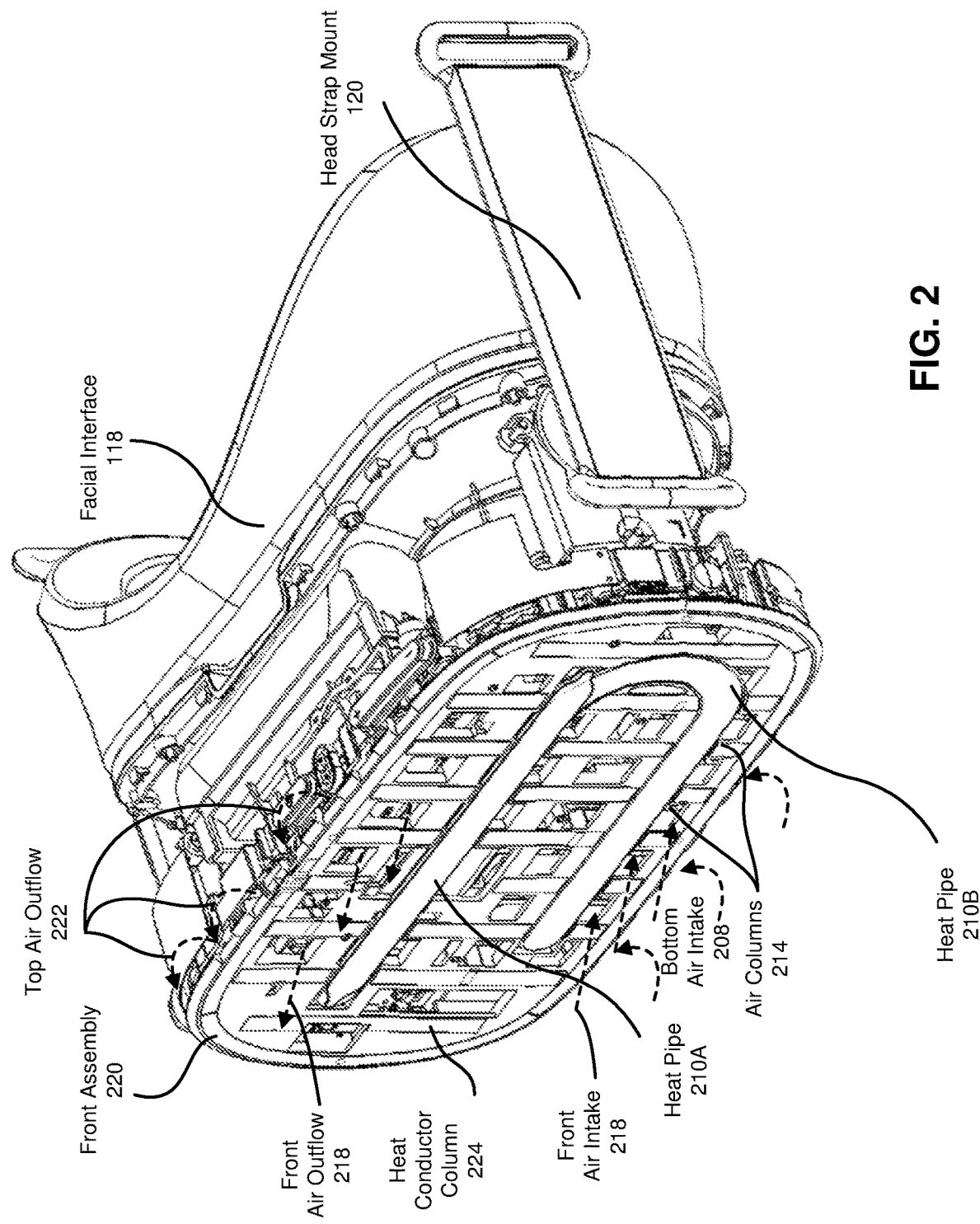
FIG. 2 is a perspective view of the interior of the HMD of FIG. 1 with a front assembly with the face plate removed, according to one embodiment.

FIG. 2 is a perspective view of the interior of the HMD 100 of FIG. 1 with a front assembly 220 with the face plate 114 removed, according to one embodiment. The front assembly 220 may include, among other components, a heat pipe 210A, a heat pipe 210B, a plurality of air columns 214, and heat conductor columns 224. The heat conductor columns 224 may be made of metal and be placed on top of the air columns 214 or on the edges of the front assembly 220 to promote heat transfer.

Each of the heat pipe 210A and the heat pipe 210B receives heat from a certain area and transfers heat to the rest of its body to facilitate heat dissipation. The heat pipes 210A and 210B are coupled to a circuit element that produces significant amount of heat (e.g., CPU) located behind the front assembly 220. In one embodiment, the heat pipe 210A may be thermally coupled to a portion of the heat pipe 210B. In some configurations, the heat pipe 210B is horse-shoe shaped.

As shown in FIG. 2, the front assembly 220 receives cool air from the bottom (as shown by arrow 208) as well as the lower portion of the front area (as shown by arrow 216) and discharges warmed air at the top (as shown by arrow 222) as well as the upper portion of the front area (as shown by arrow 218). As the cold air moves up air columns 214, heat transfer takes place between the cold air and the air columns 214, heat conductor columns 224, the heat pipes 210A, the heat pipe 210B and the electronic components. The heat conductor column 224 may extend vertically to enhance heat transfer to air passing through the air columns 214.

Figure 3:
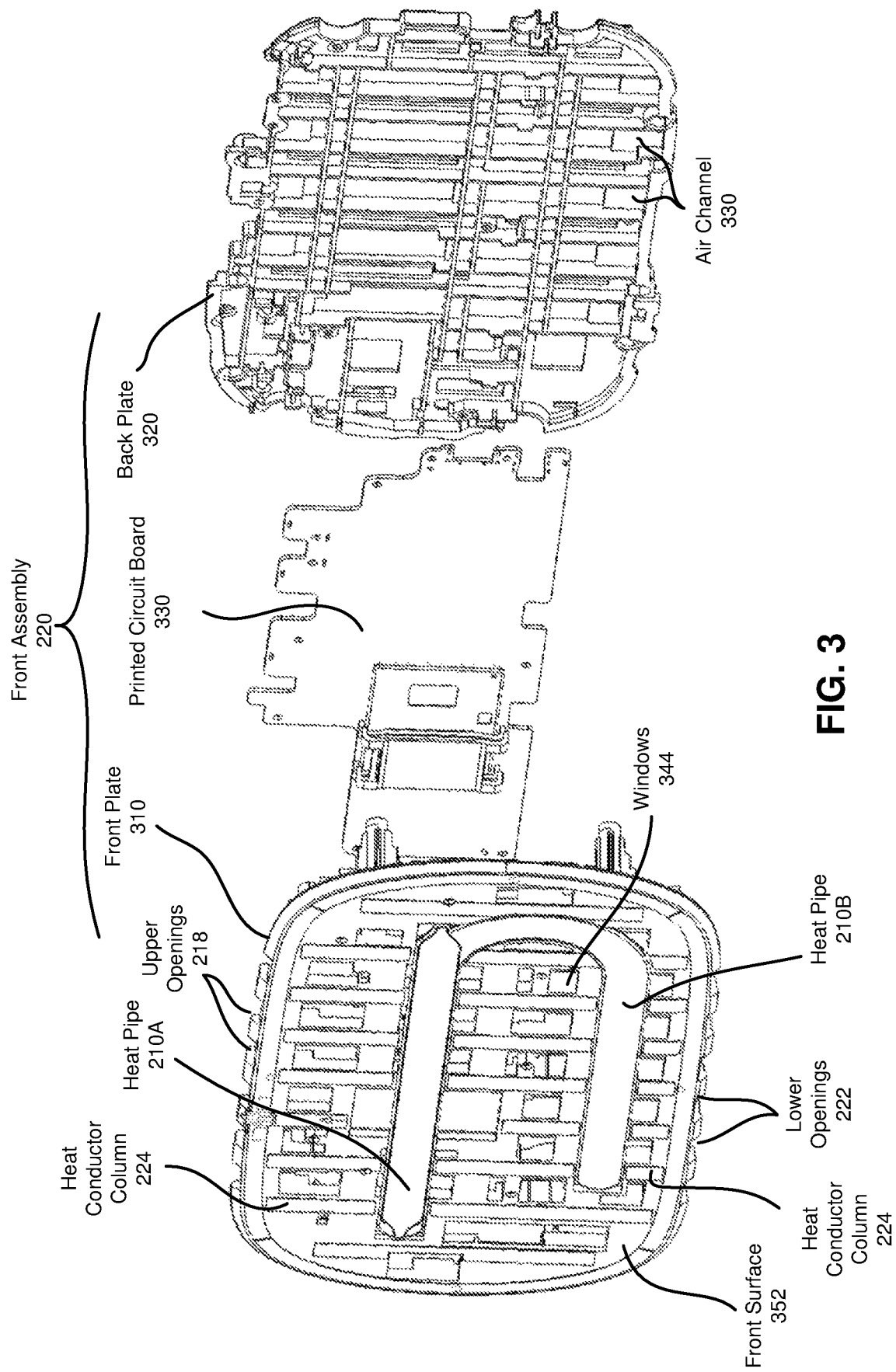
FIG. 3 is an exploded view of the front assembly including a front plate, a back plate, and a circuit board, according to one embodiment.

FIG. 3 is an exploded view of the front assembly 220 including a front plate 310, a back plate 320, and a circuit board 340, according to one embodiment. The front plate 310 includes the heat pipe 210A, the heat pipe 210B and the heat conductor column 224 at a front surface 352 of the front plate 310. The front plate 310 may be formed with windows 344 for receiving an intake air or discharging an outflow air.

Each of the front plate 310 and the back plate 320 includes air channels 330 for conveying air from the lower openings 222 at the bottom portion of the main body 110 to upper openings 218 at the upper portion of the front assembly 220.

The back plate 320 is attached to the front plate 310 and located further away from the face plate 310, as described below in detail with reference to FIG. 5.

The circuit board 340 is located between the front plate 310 and the back plate 320. The circuit board 340 may include various components, including CPU, controllers and interfacing circuits that generate heat during the operation of the HMD.

Figure 4:
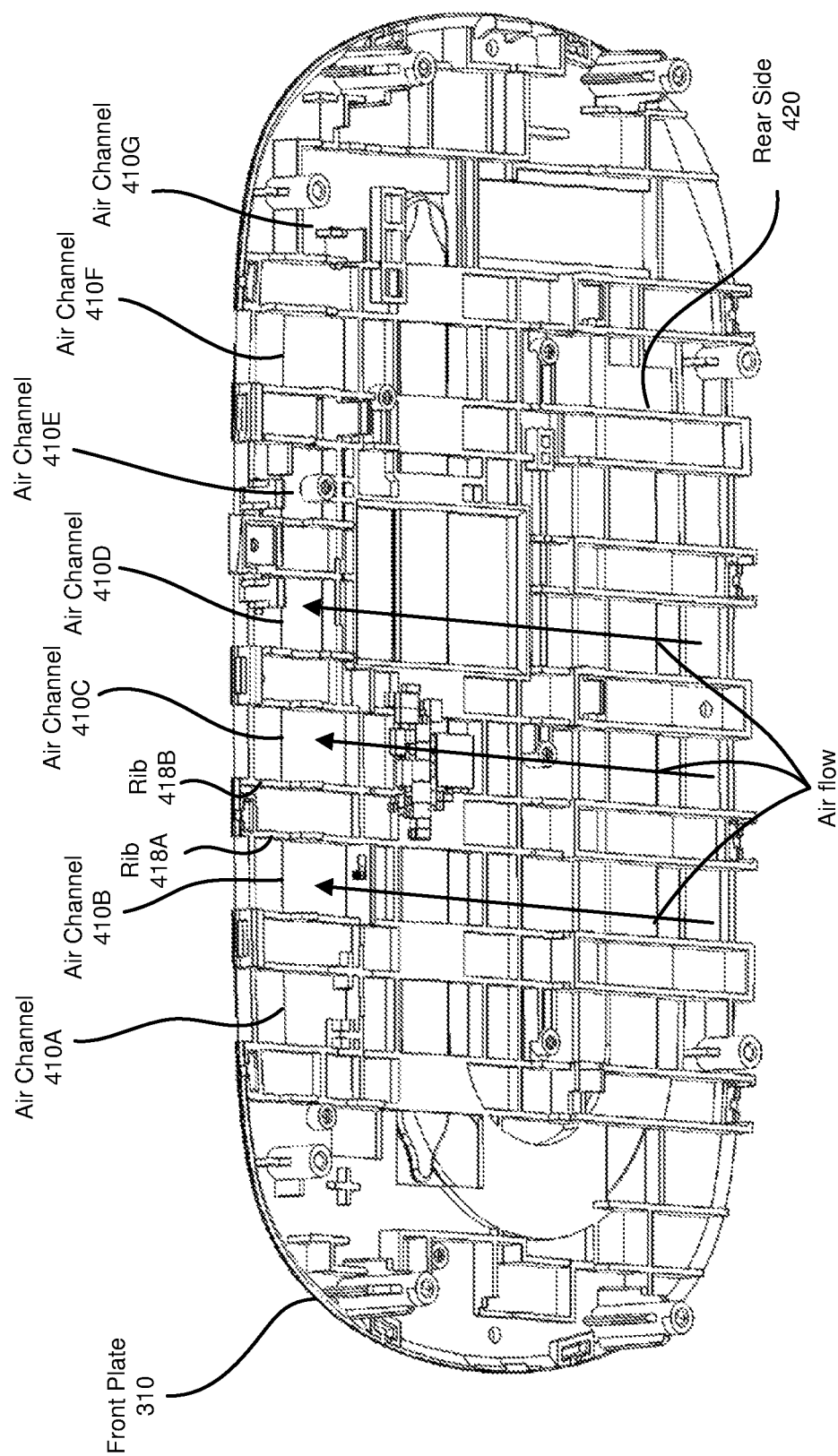
FIG. 4 is a perspective view of the front plate with air channels inside the HMD of FIG. 1, according to one embodiment.

FIG. 4 is a perspective view of the front plate 310 with air channels 410 inside the HMD of FIG. 1, according to one embodiment. The front plate 310 includes the air channels (e.g., 410A, 410B, 410C) formed at a rear side 420 of the front plate 310 facing away from the face plate 310. Each of the air channels are defined by ribs (e.g., 418A, 418B) and enable air to flow from a bottom portion of the front plate 310 to an upper portion of the front plate 310. The heat pipe 210A and the heat plate 210B traverse the air channel 410A, the air channel 410B, and the air channel 410C to improve thermal dissipation.

Figure 5:
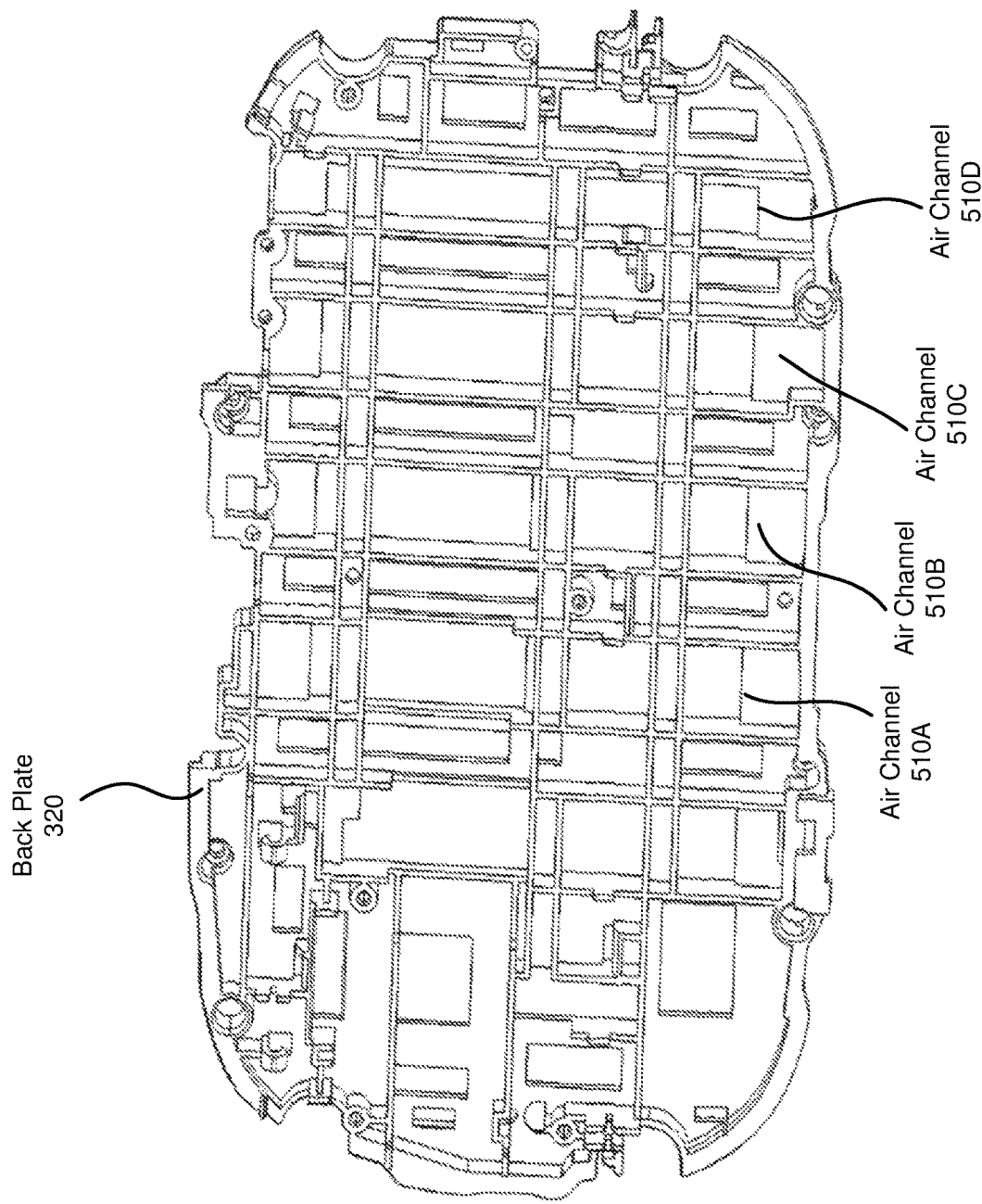
FIG. 5 is a perspective view of the back plate with air channels inside the HMD of FIG. 1, according to one embodiment.

FIG. 5 is a perspective view of the back plate 320 with air channels 510 inside the HMD of FIG. 1, according to one embodiment. The back plate 320 includes the air channels (e.g., 510A, 510B, 510C, and 510D) formed on the front side of the back plate 320 to enable air to flow from a bottom portion of the back plate 320 to an upper portion of the back plate 320. In some configurations, some of the air channels of the back plate 320 are conjoined with some of the air channels of the front plate 310. For example, the air channel 510A and the air channel 510B are conjoined with the air channel 410A, and the air channel 510C and the air channel 510D are conjoined with the air channel 410B and the air channel 410C.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

What is claimed is:

1. A head-mounted display (HMD) comprising:
   a face plate, and
   a main body configured to attach the face plate to cover a front portion of the main body, the main body comprising:
      a front plate comprising a plurality of first air channels defined by a set of ribs formed at a rear side of the front plate facing away from the face plate, at least a subset of the plurality of first air channels extending vertically to convey air from a bottom portion of the main body to an upper portion of the main body,
      a back plate attached to the front plate and located further away from the face plate than the front plate, and
      a circuit board between the front plate and the back plate.

2. The HMD of claim 1, wherein the front plate further comprises at least one heat pipe at a front side of the front plate, the at least one heat pipe traversing one or more of the plurality of first air channels to improve thermal dissipation.

3. The HMD of claim 2, wherein the back plate comprises a plurality of second air channels for conveying air from the bottom portion of the main body to the upper portion of the main body, wherein at least a subset of the plurality of second air channels extending vertically is conjoined with the subset of first air channels extending vertically.

4. The HMD of claim 2, wherein the at least one heat pipe comprises a first heat plate and a second heat plate thermally coupled to the first heat plate, and wherein the first heat plate is horse shoe shaped.

5. The HMD of claim 1, wherein an air gap is formed across a periphery of the face plate and an inner wall of the main body to intake air between the front plate and the back plate and discharge air passing through the front plate and the back plate.

6. The HMD of claim 1, wherein the front plate comprises heat conductor columns extending vertically to enhance heat transfer to air passing through the at least one first channel.

7. The HMD of claim 1, wherein each of the front plates are formed with windows for receiving an intake air or discharging an outflow air.

8. A main body of a head-mounted display (HMD), the main body comprising:
 a front plate comprising a plurality of first air channels defined by a set of ribs formed at a rear side of the front plate, at least a subset of the plurality of first air channels extending vertically to convey air from a bottom portion of the main body to an upper portion of the main body,
 a back plate attached to the front plate and located behind the front plate, and
 a circuit board between the front plate and the back plate.

9. The main body of claim 8, wherein the front plate further comprises at least one heat pipe at a front side of the front plate, the at least one heat pipe traversing one or more of the plurality of first air channels to improve thermal dissipation.

10. The main body of claim 9, wherein the back plate comprises a plurality of second air channels for conveying air from the bottom portion of the main body to the upper portion of the main body, wherein at least a subset of the plurality of second air channels extending vertically is conjoined with the subset of first air channels extending vertically.

11. The main body of claim 9, wherein the at least one heat pipe comprises a first heat plate and a second heat plate thermally coupled to the first heat plate, and wherein the first heat plate is horse shoe shaped.

12. The main body of claim 8, wherein an air gap is formed across a periphery of a face plate in front of the main body and an inner wall of the main body to intake air between the front plate and the back plate and discharge air passing through the front plate and the back plate.

13. The main body of claim 8, wherein the front plate comprises heat conductor columns extending vertically to enhance heat transfer to air passing through the at least one first channel.

\* \* \* \* \*

UNITED STATES PATENT AND TRADEMARK OFFICE
CERTIFICATE OF CORRECTION

PATENT NO. : 10,895,897 B1  
APPLICATION NO. : 16/749912  
DATED : January 19, 2021  
INVENTOR(S) : Jeffrey P. Mills Page 1 of 1

It is certified that error appears in the above-identified patent and that said Letters Patent is hereby corrected as shown below:

In the Claims

In Column 4, in Claim 6, Line 67, delete "the at least one first channel." and insert -- at least the subset of the plurality of first air channels. --, therefor.

In Column 6, in Claim 13, Lines 18-19, delete "the at least one first channel." and insert -- at least the subset of the plurality of first air channels. --, therefor.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*